US007610624B1

United States Patent
Brothers et al.

(10) Patent No.: US 7,610,624 B1
(45) Date of Patent: Oct. 27, 2009

(54) SYSTEM AND METHOD FOR DETECTING AND PREVENTING ATTACKS TO A TARGET COMPUTER SYSTEM

(75) Inventors: Jason Whitman Keith Brothers, Spanish Fork, UT (US); Peter Dennis Bartok, Orem, UT (US)

(73) Assignee: Novell, Inc., Provo, UT (US)

( * ) Notice: Subject to any disclaimer, the term of this patent is extended or adjusted under 35 U.S.C. 154(b) by 737 days.

(21) Appl. No.: 10/754,713

(22) Filed: Jan. 12, 2004

(51) Int. Cl.
*G06F 11/00* (2006.01)
*G06F 11/30* (2006.01)

(52) U.S. Cl. .............. 726/24; 726/22; 726/23; 713/188; 709/223; 709/224; 709/225

(58) Field of Classification Search ................ None
See application file for complete search history.

(56) References Cited

U.S. PATENT DOCUMENTS

| | | | |
|---|---|---|---|
| 6,275,937 B1 * | 8/2001 | Hailpern et al. ............. 713/188 |
| 6,772,345 B1 * | 8/2004 | Shetty ........................ 726/24 |
| 6,886,099 B1 * | 4/2005 | Smithson et al. ............. 726/24 |
| 7,366,919 B1 * | 4/2008 | Sobel et al. ................... 726/23 |
| 7,483,972 B2 * | 1/2009 | Bhattacharya et al. ...... 709/224 |
| 2001/0052014 A1 * | 12/2001 | Sheymov et al. ............ 709/225 |
| 2002/0104024 A1 * | 8/2002 | Sasage et al. ............... 713/201 |
| 2002/0166063 A1 * | 11/2002 | Lachman et al. ............ 713/200 |
| 2003/0084323 A1 * | 5/2003 | Gales .......................... 713/200 |
| 2003/0145232 A1 * | 7/2003 | Poletto et al. ............... 713/201 |
| 2003/0154394 A1 * | 8/2003 | Levin .......................... 713/200 |
| 2004/0093521 A1 * | 5/2004 | Hamadeh et al. ............ 713/201 |
| 2005/0050337 A1 * | 3/2005 | Liang et al. ................. 713/188 |

OTHER PUBLICATIONS

Alampalayam, S.P.; Anup Kumar, "An adaptive security model for mobile agents in wireless networks," Global Telecommunications Conference, 2003. GLOBECOM '03. IEEE , vol. 3, no., pp. 1516-1521 vol. 3, Dec. 1-5, 2003.*
Debar et al, "Towards a taxonomy of intrusion-detection systems", Computer Networks 31, pp. 805-822, published: 1999.*

* cited by examiner

*Primary Examiner*—Ponnoreay Pich
(74) *Attorney, Agent, or Firm*—Pillsbury Winthrop Shaw Pittman LLP

(57) ABSTRACT

A system and method are provided for monitoring data packets received at a target system. The data packets may be monitored at any layer of the communication protocol to characterize the type of network traffic being sent from a source machine. Upon detection of suspected and/or confirmed attacks on the target system, the monitoring server may block and/or contain data packets associated with the attacking source to prevent continued attacks on the target system. The monitoring server may monitor data packets transparently in approximately in real-time so that users of the system do not experience messaging delays.

44 Claims, 3 Drawing Sheets

SYSTEM AND METHOD FOR DETECTING AND PREVENTING ATTACKS TO A TARGET COMPUTER SYSTEM

FIELD OF THE INVENTION

The invention is directed to a system and method for detecting harmful attacks directed at a target system and preventing further attack by disabling communications between the target system and the attacking source. More particularly, the invention is directed to scanning data packets received at a target system for the existence of predetermined information that indicates an attack and preventing further attack on the target system by blocking subsequent data packets associated with the predetermined information for a predetermined amount of time.

BACKGROUND OF THE INVENTION

Security risks, including risks associated with harmful computer codes, continue to proliferate as computers become increasingly interconnected over networks, such as the Internet. Computer viruses, worms, and Trojan horses are examples of harmful computer codes that may be inserted into legitimate computer programs and subsequently executed on computers. Every time infected computer programs are executed, the viruses or worms may cause damage to the target system by destroying valuable information and/or further infecting and spreading to other machines on the network.

To complicate matters, some viruses have an ability to modify their constituent code making their identification and removal more difficult. Furthermore, new viruses may escape detection until they become widely known and recognized.

Trojan horses are similar to viruses, but do not replicate themselves. Trojan horses may remain undetected in a target computer and may be manipulated from a remote site to take control of the target computer. A critical component of viruses and Trojan horses is that they typically require help from unsuspecting computer users to successfully infect computers or corporate networks.

As many groups have discovered, connecting private networks to the Internet may have devastating consequences in the absence of adequate security mechanisms. One well-known security system that provides limited protection against intrusions from harmful computer codes is a network firewall system ("firewall"). A firewall is a system that restricts the flow of traffic between two networks based on pre-programmed access control policies. The firewall constantly scans incoming network traffic for known types of harmful computer codes. In these systems, an attack may be detected based on content of data passing through the firewall. The corrupted data may be isolated and processed accordingly. Current systems are deficient at least because they do not both detect harmful computer codes and prevent subsequent attacks. In other words, current systems may implement defensive measures to control an attack but do not take offensive measures to avert further attack. Other drawbacks exist.

Security mechanisms are also available for scanning incoming File Transfer Protocol (FTP) and HyperText Transport Protocol (HTTP) files sent from unknown sites, including monitoring source addresses to detect incoming data packets from sources that are known to be a threat and inspecting email messages for files attached thereto. Under existing implementations, target systems may be configured to scan data packets received from prior sources of harmful computer codes. However, prior sources of harmful computer codes may remain infected after an initial detection of an attack and therefore produce increased volumes of network traffic to the target network that includes the harmful computer codes. The increased traffic received from the attacking source may consume resources of the target network and may greatly reduce the availability of target system bandwidth. Various other drawbacks exist.

Furthermore, even if harmful computer codes are identified and cleansed by target systems, the threat of continuing attacks from prior sources of harmful computer codes remains. Prior attacking sources may possess an ability to send mutations of the originally sent harmful computer codes. The constant stream of network traffic attempting to repeatedly attack a target system consumes bandwidth and slows service availability to all users of the target system. Other drawbacks exist.

Other drawbacks exist with these and other known systems.

SUMMARY OF THE INVENTION

Various aspects of the invention overcome at least some of these and other drawbacks of existing systems. According to one embodiment, the invention comprises a network architecture that includes terminal devices and servers. Terminal devices and servers are used throughout this disclosure to refer to a computer's general role as a requester of data (the terminal devices) or provider of data (the servers). The network architecture may comprise a number of terminal devices, each of which may be connected or connectable to one or more servers (e.g., via a wired, wireless, and/or combination of wired and wireless connection) and/or one or more other networks (e.g., a wired network, a wireless network, a combination of wired and wireless networks or other networks). Also, one or more servers may be connected to the network.

The network architecture may include a monitoring server for monitoring data packets that are received and/or pass through servers, firewalls, routers, and/or other devices that are capable of controlling data packet flow. According to one embodiment of the invention, monitoring server may monitor data packets transparently in approximately in real-time so that users of the system do not experience messaging delays. According to another embodiment of the invention, the monitoring server may store the data packets to a storage buffer and monitor the data packets upon release from the storage buffer.

In packet-switched systems, such as Transmission Control Protocol/Internet Protocol (TCP/IP), data is transmitted in blocks of data over the network. The blocks of data, or data packets, may be packaged with a different header at each layer of the communication. The terms frame, packet and datagram are often used synonymously. The term "data packets" is used throughout this disclosure to refer to the blocks of data transmitted over the network.

According to one embodiment of the invention, the data packets may be monitored based on identifying information, such as, Internet Protocol (IP) address, port number, or other identifying information. According to another embodiment of the invention, the data packet may be monitored based on the type of communication, such as, File Transfer Protocol (FTP), Simple Mail Transfer Protocol (SMTP), Telnet, Domain Name System (DNS), Windows Internet Name System (WINS), HyperText Transfer Protocol (HTTP), Traceroute, instant messaging, chat, or other types of communication.

According to an embodiment of the invention, monitoring server may include a detection module, a scanning module, a log creating module, and a data blocking module, among other modules. These modules may be implemented using software or hardware devices. The monitoring server may be coupled to servers, firewalls, routers, and/or other devices that are capable of controlling data packet flow. Based on evaluations, determinations, and information provided by the detection module, the scanning module, the log creating module, and the data blocking module, among other modules, the monitoring server may direct the servers, firewalls, routers, and/or other devices that are capable of controlling data packet flow, to take a specified action.

For convenience, each of the related sets of functions performed by the monitoring server will be referred to as modules. These modules may be part of a single program or a collection of related components that operate together. In some cases, not all modules will need to be used or are desired to be used. The monitoring server is purposefully designed to be flexible to permit modules to be added.

By way of example, the various modules of the monitoring server may perform one or more of the following features.

Detection module may receive constant updates for the latest signatures of known harmful computer codes and may monitor received data packets for the existence of these latest signatures in order to detect an attack on the target system. According to an alternative embodiment of the invention, the detection module may monitor received data packets for predetermined identifying information that may have a history, based on previous attacks, of including infected data packets. According to yet another embodiment of the invention, the detection module may monitor received data packets for particular types of communication that may have a history, based on previous attacks, of including infected data packets. The evaluation of data packets stored in a database, or other storage device, allows for a historical evaluation of the attack and enables a reaction to the attack based on policy driven techniques, such as isolation of data packets, among other techniques.

Log creating module enables logging of suspected and/or confirmed attacks on the target system. The origin and/or destination of the data packets may also be logged. The type of traffic associated with a particular application layer may also be logged. Log creating module may generate records or events of suspected and/or confirmed attacks and may store these suspected and/or confirmed attacks in a database, based on their corresponding identifying information, type of communication, or other criteria. The log creating module may generate and/or store records of the suspected and/or confirmed attacks based on any number of criteria.

Scanning module may be configured to query the database for records of suspected and/or confirmed attacks. Scanning module may periodically initiate a query of the database or may receive a notification from the database that new records have been added to the database. Scanning module may evaluate records associated with the suspected and/or confirmed attacks and may determine the severity of the suspected and/or confirmed attacks based on predefined indicators, such as frequency of attacks associated with data packets having the same identifying information, type of communication used in the attack, amount of bandwidth usage associated with the attacks, or other predefined indicators.

Data blocking module may obtain the identifying information, the type of communication, or other information, associated with corresponding data packets to identify the attacking sources, the target devices, the communication ports, the communication protocols, or other information. According to one embodiment of the invention, if the severity of the attack is determined to be above a predetermined threshold, data blocking module may instruct switching devices and/or gateways to block data packets associated with the IP address of the attacking source, the IP address of the target device, the port number used for the communication, and/or other information, from entering the target system. Blocking data packets at switching devices and/or gateways may add a layer of protection to the internal resources of the target system and may preserve available bandwidth to the target system, among other benefits.

According to one embodiment of the invention, a system administrator may view and modify the category for the severity of the attack. According to another embodiment of the invention, the category for the severity of the attack may be stored in the database for subsequent viewing. In both cases, the data packets associated with the attacks may be viewed in an organized and easy-to-read format. Furthermore, the source of the attack may be disabled from the target system to prevent further attack on the target system.

According to one aspect of the invention, data packets associated with suspected and/or confirmed attacks on the target system are blocked and/or contained within the target system.

According to another aspect of the invention, an alert may be issued informing of suspected and/or confirmed attacks on the target system.

According to another aspect of the invention, the data packets received at the target system may be blocked by adding the IP address of the attack source and/or the IP address of the target device as entries in a DNS black list.

According to yet another aspect of the invention, the operation of blocking the data packets may be set to expire after a predetermined period of time, after a predetermined period of inactivity, or other triggering event. The triggering event may be correlated to the severity of the attack or some other reference event.

According to another aspect of the invention, the target system may notify the attacking source of the detection of the attack and/or indicate that a block was placed on the data packets received from the attacking source. The notification may be enabled through sending a message to the attacking source based on the IP address of the attacking source extracted from the data packet associated with the known harmful computer codes, preselected identifying information, or other identifying information.

According to another aspect of the invention, a determination may be made regarding whether the attack on the target system originated internally and/or externally of the target system.

According to one aspect of the invention, if the attack originated external to the target system, the firewall may be instructed to block any data packets associated with the IP address of the attacking source, the IP address of the target device, the port number used for the communication, and/or other information, from entering the target system.

According to another aspect of the invention, if the attack originated internal to the target system the server may be instructed to contain and/or block any data packets associated with the IP address of the attacking source, the IP address of the target device, the port number used for the communication, and/or other information, within the target system. Containing data packets may include isolating the attacking source and/or the target device, among other devices.

According to yet another aspect of the invention, multiple switching devices and/or gateways may be instructed to block the data packets from entering and/or traveling within the target system. For example, if the severity of the attack is determined to be above a predetermined threshold, the multiple switching devices and/or gateways may be instructed to block and/or contain data packets associated with the IP address of the attacking source, the IP address of the target device, the port number used for the communication, and/or other information, from entering and/or traveling within the target system.

The invention has numerous advantages over and avoids many drawbacks of prior systems. The invention enables detection and prevention of continuing attacks from attack sources. The invention enables disabling of switches at various devices to block entry of data packets that are suspected or confirmed of attacking the target system. The invention enables containment of data packets within the target system that are suspected or confirmed of attacking the target system. The invention also enables disabling of ports to block entry of data packets that are suspected or confirmed of attacking the target system.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below.

DETAILED DESCRIPTION OF THE INVENTION

Figure 1:
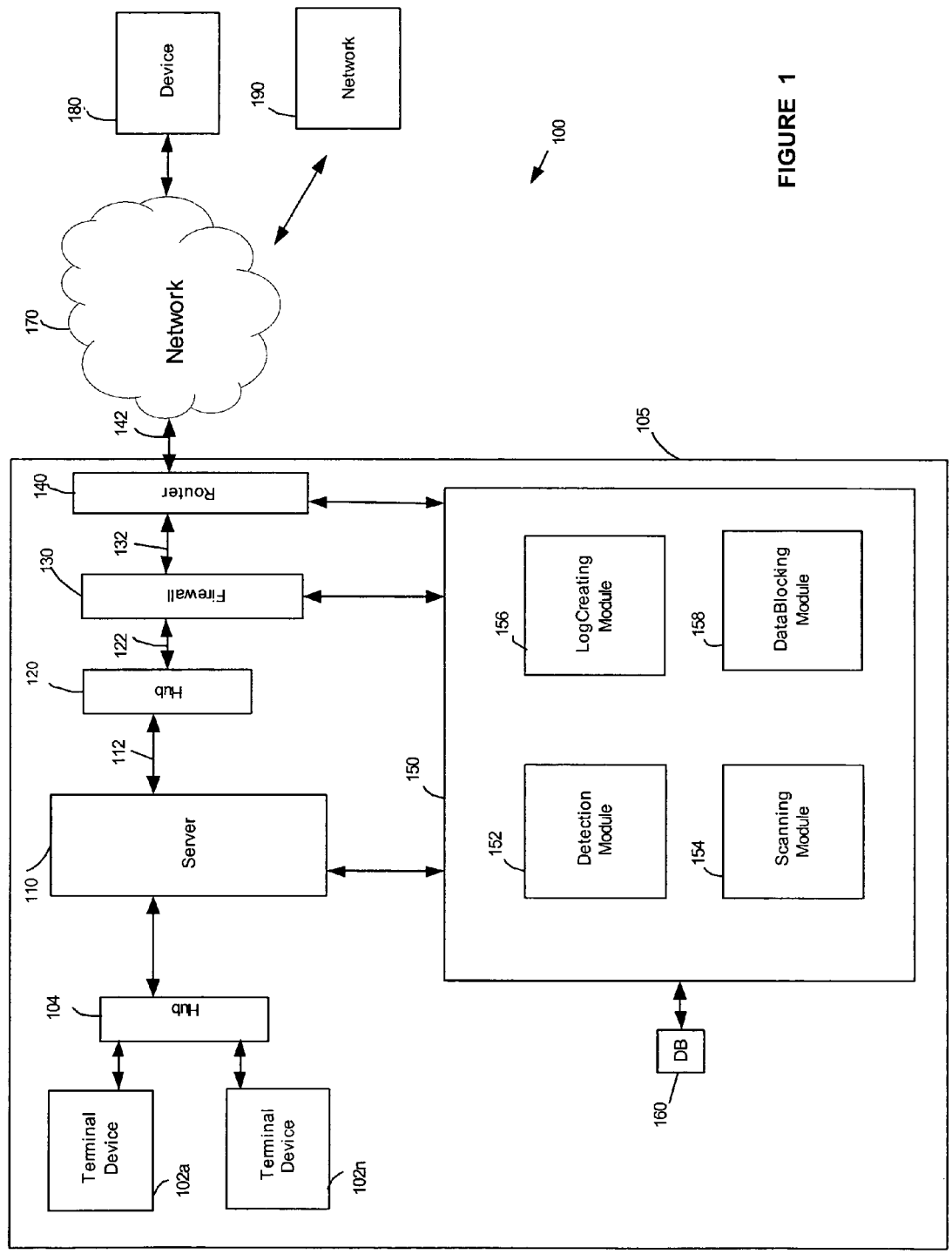
FIG. 1 illustrates an exemplary embodiment of a system diagram according to one embodiment of the invention.

FIG. 1 illustrates an example of a system architecture 100 according to one embodiment of the invention. System 100 may comprise one or more networks having a plurality of terminal devices 102*a*-102*n* (hereinafter "102"), for example, personal computers, personal digital assistants, cell phones, kiosks, or other types of terminal devices. The one or more networks may include the Internet, an intranet, a Personal Area Network (PAN), a Local Area Network (LAN), a Wide Area Network (WAN), a Metropolitan Area Network (MAN), or other networks, which may be coupled through a first hub 104 to a server 110. Server 110 may be coupled to an external network 170, such as the Internet, through a second hub 120, a firewall 130 and/or a router 140. The term "router" refers to a device that selects and implements, at the software level, data-paths from one location to another in a computer network. The system of FIG. 1 is provided for illustrative purposes only and should not be considered a limitation of the invention. Other configurations may be used.

A monitoring server 150 may be coupled to server 110, firewall 130, router 140, and/or other devices, for monitoring data packets that are received and/or pass through these devices. While monitoring server 150 is illustrated as a separate server, one of ordinary skill understands that monitoring server 150 may be integral with any of server 110, firewall 130, and router 130, among other devices.

According to one embodiment of the invention, monitoring server 150 may monitor data packets transparently in approximately in real-time so that users of the system do not experience messaging delays. The term approximately real-time is defined to be within a reasonable time of the data packets entering target system 105 and may include, for example, monitoring data packets instantaneously or monitoring data packets after a reasonable delay. According to another embodiment of the invention, monitoring server 150 may store the data packets to a storage buffer and monitor the data packets upon release from the storage buffer.

According to one embodiment of the invention, the data packets may be monitored based on identifying information, such as, Internet Protocol (IP) address, port number, or other identifying information. According to another embodiment of the invention, the data packets may be monitored based on the type of communication, such as, FTP, SMTP, Telnet, DNS, WINS, HTTP, Traceroute, instant messaging, chat, or other types of communication.

According to one embodiment of the invention, terminal devices 102 may be configured to include software and/or hardware therein that monitors the data packets received from server 110 for the inclusion of harmful computer codes. The monitoring capabilities at terminal devices 102 may be in addition to, or in place of, monitoring capabilities at monitoring server 150. According to another embodiment of the invention, monitoring server 150 may be designed so that terminal devices 102 do not require any separate software and/or hardware installed therein to monitor data packets associated with data having harmful computer codes. Providing data packet monitoring capabilities at various locations within a protected network enhances the ability to detect network attacks and minimizes the risk of disabling the monitoring system.

According to an embodiment of the invention, monitoring server 150 may be configured to monitor data packets passing between components, such as between router 140 and server 110, among other components. According to another embodiment of the invention, monitoring server 150 may be configured to monitor data packets received at one or more of router 140, firewall 130, and/or server 110.

According to one embodiment of the invention, the data packets may travel over communication lines 112, 122, 132, 142, among other communication lines. Communication lines 112, 122, 132, and 142 may include wired, wireless, or optical fiber, among other transmission mediums. Communication lines 112, 122, 132, and 142 may include Internet lines, intranet lines, and/or other communication lines. Monitoring server 150 may monitor data packets transparently without affecting network performance. In alternative embodiments of the invention, monitoring server 150 may be located in server 110, firewall 130, router 140, or any combination thereof, to monitor data packets passing between components of target system 105, such as, between router 140 and terminal devices 102, among other components.

According to another embodiment of the invention, monitoring server 150 may monitor and capture data packets that traverse communication lines 112, 122, 132, and/or 142. Each data packet may include identifying information. For example, the data packets may include identifying information such as the IP address of the originating source, the IP address of the target destination, the associated port number, and other identifying information. The IP address and port number defines specific types of signals or data sets that are able to enter the target system 105. Each data packet may also include information regarding the type of communication being conducted. For example, the data packets may include the type of communication, such as, FTP, SMTP, Telnet, DNS, WINS, HTTP, Traceroute, instant messaging, chat, or other types of communication.

Monitoring server 150 may scan the data packets passing through the communication lines for inclusion of known harmful computer codes, preselected identifying information, or other identifying information. Monitoring server 150 may discover data packets having the known harmful computer codes, preselected identifying information, or other identifying information. These data packets may be repackaged and sorted into categories in order to be displayed in real-time and/or may be stored in a database 160.

Data packets that are not identified as being associated with known harmful computer codes, preselected identifying information, or other identifying information, may not trigger the monitoring server 150 to take action and may either be released or saved in the database 160. Database 160 may be an integral part of the monitoring server 150. Alternatively, database 160 may be external to monitoring server 150. It should be readily understood that the physical location of the database 160 may be modified without adversely affecting the performance of the overall system.

Database 160 may be accessed and searched using a variety of techniques. For example, a structured query language (SQL) is a standard language for database management systems and may be used to communicate with database 160 that supports monitoring server 150. SQL statements may be used to perform tasks such as, for example, updating data on database 160 and/or retrieving data from database 160. Thus, a user may generate customized reports and alerts using SQL statements. It should be readily understood that other equally effective database accessing languages may be used to communicate with database 160.

Figure 2:
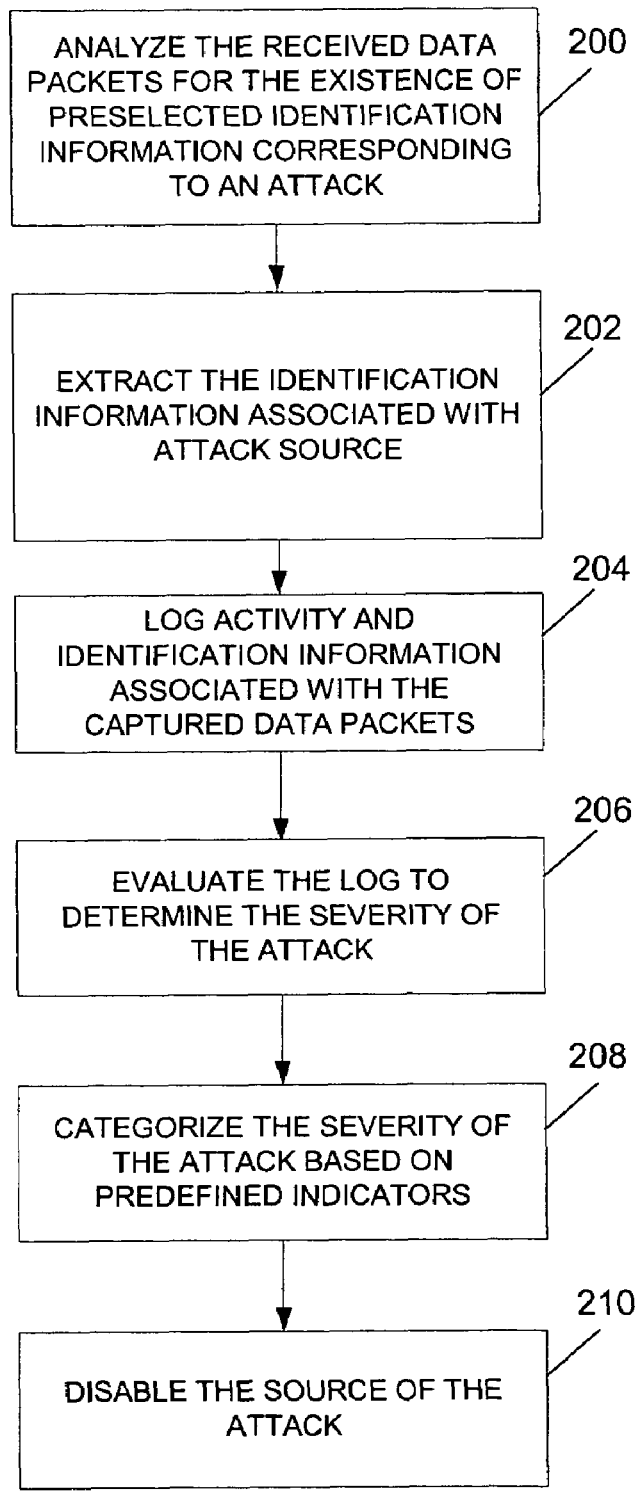
FIG. 2 illustrates a flow chart schematic of the present invention.

FIG. 2 illustrates a flow diagram of a generalized method for implementing the invention. In an operation 200, the communication lines 112, 122, 132, 142 are monitored in real-time to identify data packets associated with known harmful computer codes, preselected identifying information, or other identifying information that correspond to an attack on target system 105. In an operation 202, the data packets associated with known harmful computer codes, preselected identifying information, or other identifying information that correspond to an attack are captured and the corresponding identifying information is extracted.

In an operation 204, activity, identifying information, and/or other characteristics associated with the captured data packets are logged. In an operation 206, the log is evaluated to determine the severity of the attack. In an operation 208, the severity of the attack is categorized based on predefined indicators. According to one embodiment of the invention, a system administrator may view and modify the category for the severity of the attack in real-time during operation. According to an alternative embodiment of the invention, the category for the severity of the attack may be stored in the database 160 for subsequent viewing. In both cases, the data packets associated with the attacks may be viewed in an organized and easy-to-read format. In operation 210, the source of the attack may be disabled from the target system 105 to prevent further attack on the target system 105.

According to one embodiment of the invention, monitoring server 150 may be configured to detect data packets associated with known harmful computer codes, preselected identifying information, or other identifying information. Monitoring server 150 may be configured to prevent further entry of these data packets into target system 105 and/or to prevent further spreading of these data packets in target system 105. Target system 105 may include one or more target devices, such as terminal devices 102, server 110, or other devices. To this end, monitoring server 150 may include detection module 152, scanning module 154, log creating module 156, and data blocking module 158, among other modules.

According to one embodiment of the invention, detection module 152 may receive constant updates for the latest signatures of known harmful computer codes and may monitor received data packets for the existence of these latest signatures in order to detect an attack on target system 105. According to an alternative embodiment of the invention, detection module 152 may monitor received data packets for predetermined identifying information that may have a history, based on previous attacks, of including infected data packets. According to yet another embodiment of the invention, detection module 152 may monitor received data packets for particular types of communication that may have a history, based on previous attacks, of including infected data packets. The evaluation of data packets stored in database 160, or other storage device, allows for a historical evaluation of the attack and enables a reaction to the attack based on policy driven isolation techniques. It should be readily understood that, in addition to monitoring for data packets, other equally effective types of information may be monitored to identify attacks on target system 105.

According to one embodiment of the invention, log creating module 156 may be coupled to the detection module 152 to enable logging of suspected and/or confirmed attacks on target system 105. According to an alternative embodiment of the invention, log creating module 156 may be coupled to any device that processes incoming data packets and/or outgoing data packets at a level where an attack on target system 105 may be detected. For example, network traffic using TCP/IP may be logged at the application layer (i.e., above layer-4) to characterize the type of network traffic being sent from a source machine. The origin and/or destination of the data packets may also be logged. The type of traffic associated with a particular application layer may be evaluated to determine an "attack profile". For example, attacks may be prevalent via email applications. Therefore, if a sudden increase in SMTP traffic is detected, the identifying information of the data packets and the corresponding source machine may be logged and other action taken, such as blocking and/or containing the data packets.

In addition to creating the attack profile based on an evaluation of the type of network traffic, other criteria may be used to create the attack profile. For example, the attack profile may be created based on the time of day the data packets were received, the frequency that the data packets were received, and other criteria. Furthermore, the identifying information of attack source and/or target device may be logged. The logging may be provided by a switch operating above layer-4 or a proxy device that transparently proxies the network traffic for the protocols used to detect events to be logged, among other devices.

Log creating module 156 may generate records or events of suspected and/or confirmed attacks and may store these suspected and/or confirmed attacks in database 160 based on their corresponding identifying information, type of communication, or other criteria. The log creating module 156 may generate and/or store records of the suspected and/or confirmed attacks based on any number of criteria. Database 160 may be a system such as Nsure Audit created by NOVELL, INC. or any logging data store, such as SYSLOG, which is a standardized logging interface that may be queried. According to an alternative embodiment of the invention, records of the suspected and/or confirmed attacks may be stored at a location other than database 160 with equal effectiveness.

According to one embodiment of the invention, scanning module 154 may be configured to query database 160 for records of suspected and/or confirmed attacks. Scanning module 154 may periodically initiate a query of database 160 or may receive a notification from database 160 that new records have been added to database 160. Scanning module 154 may evaluate records associated with the suspected and/or confirmed attacks and may determine the severity of the suspected and/or confirmed attacks based on predefined indicators, such as frequency of attacks associated with data packets having the same identifying information, type of communication used in the attack, amount of bandwidth usage associated with the attacks, or other predefined indicators.

Based upon the assessment of the suspected and/or confirmed attacks, data blocking module 158 may obtain the identifying information, the type of communication, or other information, associated with corresponding data packets to identify the attacking sources, the target devices, the communication ports, the communication protocols, or other information. Attacking sources may be internal and/or external to target system 105. According to one embodiment of the invention, attacking sources may include one or more of device 180, network 190, terminal devices 102, server 110, or other attacking sources.

According to an embodiment of the invention, the attacking source may originate the attack in an email message communicated using the SMTP protocol. The SMTP protocol may provide information to enable determination of the IP address of the attacking source, the IP address of the target device, the port number used for the communication, and/or or other information.

Figure 3:
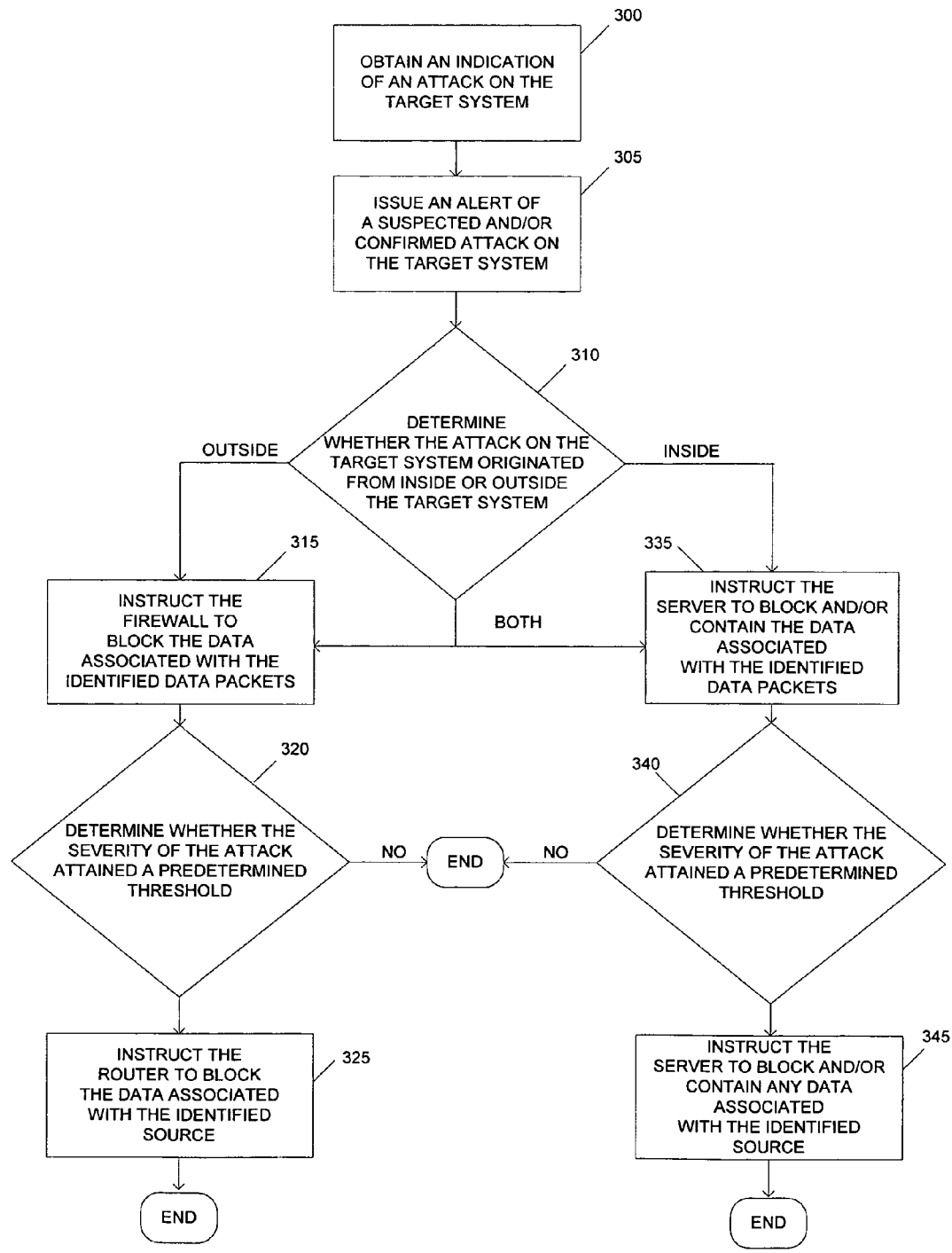
FIG. 3 illustrates a flow chart schematic associated with the data blocking module of the present invention.

FIG. 3 illustrates a flow diagram of a method for implementing data blocking module 158. Data blocking module 158 may communicate with scanning module 152, scanning module 154, and/or log creating module 156 to obtain an indication of an attack on the target system 105 in operation 300. Furthermore, data blocking module 158 may be coupled to router 140, firewall 130, and/or server 110, among other devices, to communicate with these devices during an attack on target system 105. Data blocking module 158 is configured to block entry of data packets associated with the suspected and/or confirmed attacks into target system 105 and/or to contain and/or block data packets associated with the suspected and/or confirmed attacks that are within target system 105. According to an embodiment of the invention, data blocking module 158 may issue an alert of a suspected and/or confirmed attack on the target system 105 in operation 305.

According to another embodiment of the invention, the data packets received at target system 105 may be blocked by adding the IP address of the attack source and/or the IP address of the target device as entries in a DNS black list. Identifying information from the scanned data packets may be compared to the DNS black list upon receipt at target system 105. If a match is determined to exist between the IP address of the attack source or the IP address of the target device and entries in a DNS black list, then the corresponding data packet is blocked from entering target system 105.

According to yet another embodiment of the invention, blocking of the data packets may be set to expire after a predetermined period of time, after a predetermined period of inactivity, or other triggering event. The triggering event may be correlated to the severity of the attack or some other reference event. Alternatively, the data packets may be blocked permanently, in which case a system administrator or other entity may need to manually reset the flow of data packets. A permanent block of the data packets may occur if the attack source is determined to be a habitual attacker, which may signify that the attacking source is not well cared for or not used often. In this regard, attack patterns may be correlated to the severity of the attack in order to make a determination regarding the length of time the block will be enforced.

According to one embodiment of the invention, the target system 105 may notify the attacking source of the detection of the attack and/or indicate that a block was placed on the data packets received from the attacking source. According to one embodiment of the invention, the notification may be enabled through sending a message to the attacking source based on the IP address of the attacking source extracted from the data packet associated with the known harmful computer codes, preselected identifying information, or other identifying information. According to another embodiment of the invention, if the attack is detected via email, the target system 105 may notify the attacking source via a SMTP error response about the reason for the block.

In operation 310, a determination may be made regarding whether the attack on target system 105 originated internally and/or externally of target system 105. According to an embodiment of the invention in which the attack originated external to target system 105, data blocking module 158 may instruct firewall 130 to block any data packets associated with the IP address of the attacking source, the IP address of the target device, the port number used for the communication, and/or other information, from entering target system 105 in operation 315.

According to another embodiment of the invention in which the attack originated internal to target system 105, data blocking module 158 may instruct server 110 to contain and/or block any data packets associated with the IP address of the attacking source, the IP address of the target device, the port number used for the communication, and/or other information, within target system 105 in operation 335. Containing data packets may also include isolating the attacking source and/or the target device. Furthermore, suspected target devices may be isolated to reduce spreading of infection within the target system 105.

Depending on several factors associated with the attack on target system 105, such as, the severity of the attack, the type of attack, and/or other factors, the volume of traffic received at target system 105 or the volume of traffic generated within target system 105 may increase rapidly. The increased traffic volume attempting to enter target system 105 may place a great burden on firewall 130 and/or the increased traffic volume within target system 105 may place a great burden on server 110 to scan an increasing number of data packets.

According to an embodiment of the invention, while firewall 130 and/or server 110 are actively scanning the data packets for the IP address of the attacking source, the IP address of the target device, the port number used for the communication, and/or other information, data blocking module 158 may communicate with scanning module 154 to determine the severity of the attack on target system 105 in operations 320 and 340.

According to one embodiment of the invention, if the severity of the attack is determined to be above a predetermined threshold, data blocking module 158 may instruct router 140 to block data packets associated with the IP address of the attacking source, the IP address of the target device, the port number used for the communication, and/or other information, from entering target system 105 in operation 325. Blocking data packets at router 140 may preserve available bandwidth to target system 105, among other benefits. Furthermore, blocking data packets at router 140, in addition to blocking data packets at firewall 130, adds an additional layer of protection to target system 105 and relieves firewall 130 of bottlenecks.

According to another embodiment of the invention, if the severity of the attack is determined to be above a predetermined threshold, data blocking module 158 may instruct server 110 to contain and/or block any data packets associated with the IP address of the attacking source, the IP address of the target device, the port number used for the communication, and/or other information by isolating the attack source in operation 345.

Isolating the attack source within target system 105 protects resources within target system 105 from being used for additional attacks originating both internally and externally of target system 105. Furthermore, isolating the attack source within target system 105 may prevent further spreading of the attack and may preserve available bandwidth of target system 105, among other benefits. Furthermore, isolating the attack source in addition to containing data packets at server 110 adds an additional layer of protection to target system 105 and frees computing resources at server 110. According to an alternative embodiment, suspected target devices also may be isolated to reduce spreading of infection within the target system 105. The suspected target devices may be evaluated and cleaned, if necessary.

According to an embodiment of the invention, monitoring server 150 may detect an attack on target system 105 and may prevent data packets that are associated with the attack from entering a defined perimeter of target system 105. By preventing data packets that are associated with the attack from entering the defined perimeter, the monitoring server 150 may protect resources within the defined perimeter. However, if the IP address of the attacking source is determined to originate within the defined perimeter (i.e., internal) to target system 105, data blocking module 158 may automatically disable switching port(s) that connect the attacking source to the target system 105. System administrators or other persons may be notified of the action so that measures may be taken to clean the internally attacking source, reconnect the infected machine, and enable the switching port(s). Thus, internal attacks may be isolated by manipulating the target system 105 infrastructure, while external attacks may be isolated at the perimeter of target system 105.

According to an alternative embodiment of the invention, attacks originating from external sources may be blocked by manipulating the target system 105 infrastructure. For example, data blocking module 158 may disable switching port(s) that connect external attacking sources to target system 105, among other infrastructure changes. However, other essential applications may rely on the disabled switching port(s). By disabling the switching port(s) to the external attacking sources, data blocking module 158 may unknowingly shut down other critical applications. Therefore, prior to shutting down the switching port(s), data blocking module 158 may evaluate an inventory list of other valid applications that operate over these switching ports. The inventory list may be created using techniques such as associating switching port numbers with specific machines so that applications running on the specific machines may be identified, among other inventory creating techniques.

According to one embodiment of the invention, monitoring server 150 may disable network traffic by blocking the network traffic at switches and/or gateways. Switches and/or gateways may include routers, hubs, servers, or other devices capable of controlling the flow of data packets. Positioning the switches and/or gateway outside target system 105 provides a benefit, among other benefits, of reducing the burden on target system 105 resources to monitor for harmful data packets, such as at firewall 130. Furthermore, blocking harmful data packets before they enter the target system 105 minimizes any possible infection and/or disruption to resources inside target system 105.

The network traffic to be blocked may be identified based on identifying information, such as, Internet Protocol (IP) address, port number, or other identifying information. According to another embodiment of the invention, the data packets may be blocked based on the type of communication, such as, FTP, SMTP, Telnet, DNS, WINS, HTTP, Traceroute, instant messaging, chat, or other types of communication.

While the preferred forms of the invention have been disclosed, it will be apparent to those skilled in the art that various changes and modifications may be made that will achieve some of the advantages of the invention without departing from the spirit and scope of the invention. It will be apparent to those reasonably skilled in the art that other components performing the same function may be suitably substituted. Further, the methods of the invention may be achieved in either all software implementations, using the appropriate processor instructions, or in hybrid implementations that utilize a combination of hardware logic and software logic to achieve the same results. Therefore, the scope of the invention is to be determined solely by the appended claims.

What is claimed is:

1. A system for protecting a computer network, the system comprising at least one computer device, the at least one computer device having one or more modules, including:

a detection module configured to:

monitor one or more packets received from a source device to determine whether one or more of the received packets include one or more harmful computer code signatures, and to further monitor the received packets to determine whether one or more of the received packets include identifying information that has a history of being included in packets associated with one or more previous attacks directed at a target device coupled to the network; and detect an attack directed at the target device if one or more of the monitored packets include one or more of the harmful computer code signatures, and to further detect the attack if one or more of the monitored packets include the identifying information that has the history of being included in packets associated with the previous attacks directed at the target device;

a scanning module configured to determine a severity of the detected attack directed at the target device;

a log creating module configured to create an attack profile based on information associated with the detected attack, wherein the attack profile provides identifying information included in the monitored packets that include the harmful computer code signatures, and wherein the attack profile further provides the identifying information that has the history of being included in packets associated with the previous attacks directed at the target device; and a blocking module configured to:

block one or more of the monitored packets from being transmitted to the target device, wherein the blocked packets include the identifying information provided in the attack profile, and wherein the blocking module is further configured to disable a communication channel connecting the source device to the target device to block the packets from being transmitted to the target device;

block one or more subsequently received packets from being transmitted to the target device if the severity of the detected attack exceeds a predetermined threshold, wherein the subsequently blocked packets include packets originating form the source device and packets directed to the target device;

notify a user if the source device originates internally to a defined perimeter of the target device, wherein the user is notified that the communication channel has been disabled and that the attack originated internally to the defined perimeter of the target device; and enable the communication channel for at least one system that runs a valid application over the communication channel if the source device originates externally to the defined perimeter of the target device.

2. The system according to claim 1, wherein the log creating module is further configured to store, in a database, identifying information included in one or more packets associated with suspected or confirmed attacks directed at the target device.

3. The system according to claim 1, wherein the identifying information provided in the attack profile identifies a type of communication associated with the detected attack.

4. The system according to claim 1, wherein the scanning module is further configured to determine the severity of the detected attack based on at least one of a frequency of the previous attacks, a type of communication used in the previous attacks, an amount of bandwidth usage associated with the previous attacks, or a volume of the received packets.

5. The system according to claim 1, wherein the blocking module is further configured to instruct at least one of a router, a hub, a server, or a firewall to disable the communication channel connecting the source device to the target device in order to block the packets from being transmitted to the target device.

6. The system according to claim 5, wherein blocking the subsequently received packets from being transmitted to the target device expires after at least one of a predetermined amount of time, a predetermined period of inactivity, or an occurrence of a triggering event.

7. The system according to claim 1, wherein the attack profile further provides identifying information included in one or more packets associated with one or more of suspected or confirmed attacks directed at the target device.

8. A computer device for detecting and preventing attacks directed at a target system, the computer device having one or more modules that cause the computer device to:

receive one or more packets originating from a source system, wherein the received packets are directed to the target system;

monitor the received packets to determine whether one or more of the received packets include one or more harmful computer code signatures, and further monitor the received packets to determine whether one or more of the received packets include identifying information that has a history of being included in packets associated with one or more previous attacks directed at the target system;

detect an attack directed at the target system if one or more of the monitored packets include one or more of the harmful computer code signatures, and further detect the attack if one or more of the monitored packets include the identifying information that has the history of being included in packets associated with the previous attacks directed at the target system;

create an attack profile based on information associated with the detected attack, wherein the attack profile provides identifying information included in the monitored packets that include the harmful computer code signatures, and wherein the attack profile further provides the identifying information that has the history of being included in packets associated with the previous attacks directed at the target system;

block one or more of the monitored packets from being transmitted to the target system, wherein the blocked packets include the identifying information provided in the attack profile, and further to disable a communication channel connecting the source system to the target system to block the packets from being transmitted to the target system;

block one or more subsequently received packets from being transmitted to the target system if a severity of the detected attack exceeds a predetermined threshold, wherein the subsequently blocked packets include packets originating from the source system and packets directed to the target system;

notifying a user if the source system originates internally to a defined perimeter of the target system, wherein the user is notified that the communication channel has been disabled and that the attack originated internally to the defined perimeter of the target system; and enable the communication channel for at least one system that runs a valid application over the communication channel if the source system originates externally to the defined perimeter of the target system.

9. The computer device according to claim 8, wherein the received packets are monitored transparently in real time.

10. The computer device according to claim 8, wherein the received packets are stored in a storage buffer and monitored upon release from the storage buffer.

11. The computer device according to claim 8, wherein the one or more modules further cause the computer device to determine the severity of the detected attack based on at least one of a frequency of the previous attacks, a type of communication used in the previous attacks, an amount of bandwidth usage associated with the previous attacks, or a volume of the received packets.

12. The computer device according to claim 8, wherein the one or more modules further cause the computer device to instruct at least one of a router, a hub, a server, or a firewall to disable the communication channel connecting the source system to the target system in order to block the packets from being transmitted to the target system.

13. The computer device according to claim 8, wherein the one or more modules further cause the computer device to notify the source system that the attack has been detected and that a block was placed on packets received from the source system.

14. The computer device according to claim 8, wherein blocking the subsequently received packets from being transmitted to the target system expires after at least one of a predetermined amount of time, a predetermined period of inactivity, or an occurrence of a triggering event.

15. The computer device according to claim 8, wherein the attack profile further provides identifying information included in one or more packets associated with one or more of suspected or confirmed attacks directed at the target system.

16. A computer system configured for detecting and preventing attacks directed at terminal devices, comprising:

at least one terminal device;

at least one server coupled to a computer network and to the at least one terminal device, wherein the at least one server is configured to monitor packets directed to the at least one terminal device, the at least one server having one or more modules, including:
- a detection module configured to:
  - monitor one or more packets received from a source device to determine whether one or more of the received packets include one or more harmful computer code signatures, and to further monitor the received packets to determine whether one or more of the received packets include identifying information that has a history of being included in packets associated with one or more previous attacks directed at the at least one terminal device; and
  - detect an attack directed at the at least one terminal device if one or more of the monitored packets include one or more of the harmful computer code signatures, and to further detect the attack if one or more of the monitored packets include the identifying information that has the history of being included in packets associated with the previous attacks directed at the at least one terminal device;
- a log creating module configured to create an attack profile based on information associated with the detected attack, wherein the attack profile provides identifying information included in one or more of the monitored packets that include the harmful computer code signatures, and wherein the attack profile further provides the identifying information that has the history of being included in packets associated with the previous attacks directed at the at least one terminal device;
- a scanning module configured to determine a severity of the detected attack directed at the at least one terminal device; and
- a blocking module configured to:
  - block one or more of the monitored packets from being transmitted to the at least one terminal device, wherein the blocked packets include the identifying information provided in the attack profile, and wherein the blocking module is further configured to disable a communication channel connecting the source device to the at least one terminal device to block the packets from being transmitted to the at least one terminal device;
  - block one or more subsequently received packets from being transmitted to the at least one terminal device if the severity of the detected attack exceeds a predetermined threshold, wherein the subsequently blocked packets include packets originating from the source device and packets directed to the at least one terminal device;
  - notify a user if the source device originates internally to a defined perimeter of the at least one terminal device, wherein the user is notified that the communication channel has been disabled and that the attack originated internally to the defined perimeter of the at least one terminal device; and
  - enable the communication channel for at least one system that runs a valid application over the communication channel if the source device originates externally to the defined perimeter of the at least one terminal device.

17. The computer system according to claim 16, further comprising a database coupled to the at least one server.

18. The computer system according to claim 17, wherein the log creating module is further configured to store, in the database, identifying information included in one or more packets associated with suspected or confirmed attacks directed at the at least one terminal device.

19. The computer system according to claim 16, wherein the identifying information provided in the attack profile identifies a type of communication associated with the detected attack.

20. The computer system according to claim 16, wherein the scanning module is further configured to determine the severity of the detected attack based on at least one of a frequency of the previous attacks, a type of communication used in the previous attacks, an amount of bandwidth usage associated with the previous attacks, or a volume of the received packets.

21. The computer system according to claim 16, wherein the blocking module is further configured to instruct at least one of a router, a hub, the at least one server, or a firewall to disable the communication channel connecting the source device to the at least one terminal device in order to block the packets from being transmitted to the at least one terminal device.

22. The computer system according to claim 16, wherein blocking the subsequently received packets from being transmitted to the at least one terminal device expires after at least one of a predetermined amount of time, a predetermined period of inactivity, or an occurrence of a triggering event.

23. The computer system according to claim 16, wherein the at least one server is further configured to issue an alert to inform an administrator of the network of the detected attack directed at the at least one terminal device.

24. The computer system according to claim 16, wherein the attack profile further provides identifying information included in one or more packets associated with one or more of suspected or confirmed attacks directed at the at least one terminal device.

25. A method for detecting and preventing attacks directed at a target system, comprising:
- receiving one or more packets originating from a source system, wherein the received packets are directed to the target system;
- monitoring the received packets to determine whether one or more of the received packets include one or more harmful computer code signatures, and further monitoring the received packets to determine whether one or more of the received packets include identifying information that has a history of being included in packets associated with one or more previous attacks directed at the target system;
- detecting an attack directed at the target system if one or more of the monitored packets include one or more of the harmful computer code signatures, and further detecting the attack if one or more of the monitored packets include the identifying information that has the history of being included in packets associated with the previous attacks directed at the target system;
- creating an attack profile based on information associated with the detected attack, wherein the attack profile provides identifying information included in the monitored packets that include the harmful computer code signatures, and wherein the attack profile further provides the identifying information that has the history of being included in packets associated with the previous attacks directed at the target system;
- blocking one or more of the monitored packets from being transmitted to the target system, wherein the blocked packets include the identifying information provided in the attack profile, and wherein blocking the packets from being transmitted to the target system includes disabling a communication channel connecting the source system to the target system;

blocking one or more subsequently received packets from being transmitted to the target system if a severity of the detected attack exceeds a predetermined threshold, wherein the subsequently blocked packets include packets originating from the source system and packets directed to the target system;

notifying a user if the source system originates internally to a defined perimeter of the target system, wherein the user is notified that the communication channel has been disabled and that the attack originated internally to the defined perimeter of the target system; and enabling the communication channel for at least one system that runs a valid application over the communication channel if the source system originates externally to the defined perimeter of the target system.

26. The method according to claim 25, wherein the identifying information provided in the attack profile identifies a type of communication associated with the detected attack.

27. The method according to claim 26, wherein the type of communication associated with the detected attack includes at least one of File Transfer Protocol, Simple Mail Transfer Protocol, Telnet, Domain Name System, Windows Internet Name System, HyperText Transfer Protocol, Traceroute, instant messaging, or chat.

28. The method according to claim 26, wherein the received packets are monitored using Transmission Control Protocol/Internet Protocol at an application layer to characterize the type of communication associated with the packets originating from the source system.

29. The method according to claim 25, wherein the identifying information provided in the attack profile identifies at least one of a source Internet Protocol address, a source port number, a destination Internet Protocol address, or a destination port number associated with the detected attack.

30. The method according to claim 29, wherein the subsequently blocked packets include information identifying one or more of the source Internet Protocol address, the source port number, the destination Internet Protocol address, or the destination port number.

31. The method according to claim 25, further comprising determining the severity of the detected attack based on at least one of a frequency of the previous attacks, a type of communication used in the previous attacks, an amount of bandwidth usage associated with the previous attacks, or a volume of the received packets.

32. The method according to claim 25, wherein at least one of a router, a hub, a server, or a firewall is instructed to disable the communication channel connecting the source system to the target system.

33. The method according to claim 25, further comprising notifying the source system that the attack has been detected and that a block was placed on packets received from the source system.

34. The method according to claim 25, wherein blocking the subsequently received packets from being transmitted to the target system expires after at least one of a predetermined amount of time, a predetermined period of inactivity, or an occurrence of a triggering event.

35. The method according to claim 34, further comprising correlating a pattern for the detected attack to the severity of the detected attack to determine the amount of time and the period of inactivity after which blocking the subsequently received packets from being transmitted to the target system expires.

36. The method according to claim 25, wherein the attack profile further provides identifying information included in one or more packets associated with one or more of suspected or confirmed attacks directed at the target system.

37. The method according to claim 36, further comprising storing, in a database, the identifying information included in the one or more packets associated with the suspected or confirmed attacks directed at the target system.

38. The method of according to claim 37, further comprising:

scanning the identifying information stored in the database to determine the severity of the detected attack; and enabling a user to view and modify the severity of the detected attack.

39. The method of according to claim 37, further comprising scanning the identifying information stored in the database to enable a reaction to the suspected or confirmed attacks based on one or more isolation policies.

40. The method according to claim 25, wherein disabling the communication channel causes packets that are suspected or confirmed of attacking the target system to be contained within the target system.

41. The method according to claim 25, wherein the attack profile further provides information identifying a time of day and a frequency that that the monitored packets were received.

42. The method according to claim 25, wherein the subsequently blocked packets further include the identifying information provided in the attack profile.

43. The method according to claim 25, further comprising permanently blocking subsequently received packets originating from the source system from being transmitted to the target system if the severity of the detected attack indicates that the source system is a habitual attacker of the target system.

44. The method according to claim 43, wherein a user can manually reset the permanent block on the subsequently received packets originating from the source system to allow a flow of packets originating from the source system to the target system.

* * * * *